June 26, 1951   F. W. OPP ET AL   2,558,376
SOIL AND WEED TREATING APPARATUS
Filed Aug. 29, 1949
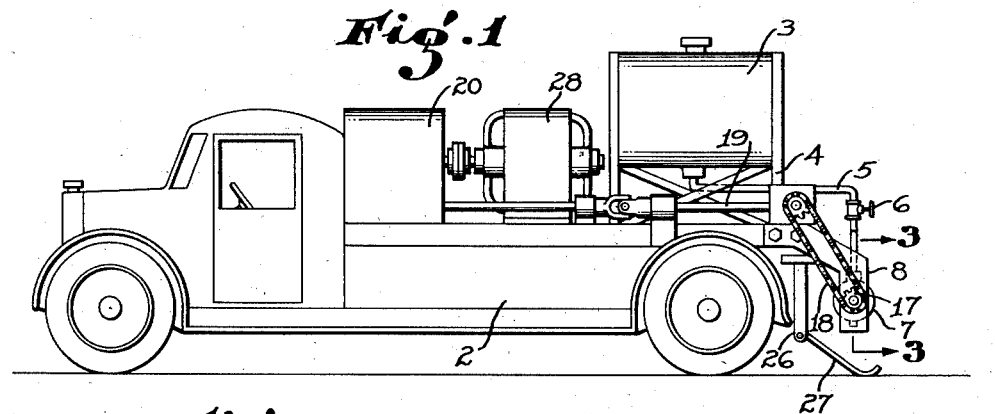
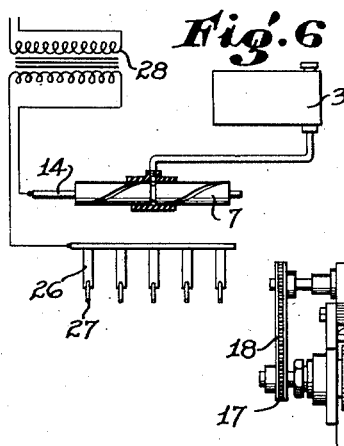
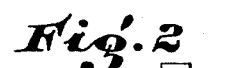
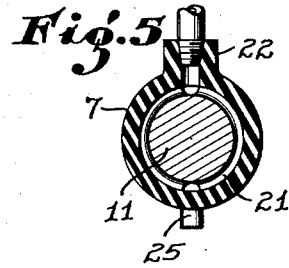
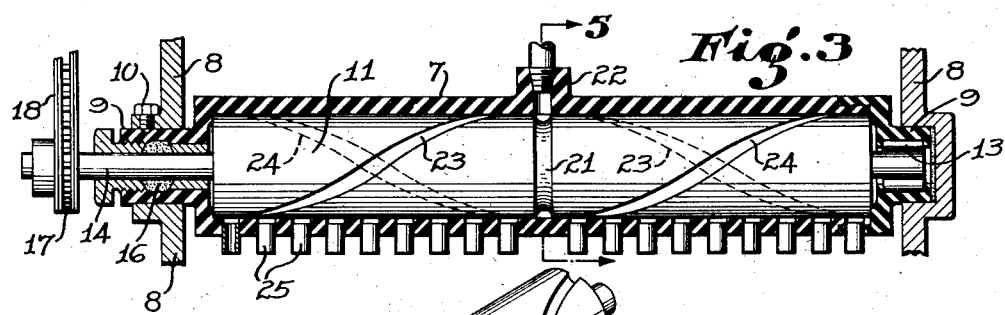
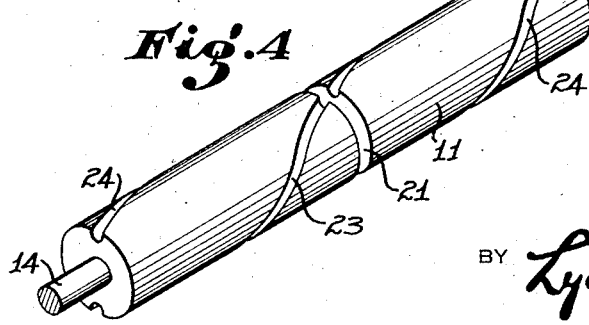
INVENTOR.
FRED W. OPP
WALTER H. OPP
BY Lyon & Lyon
ATTORNEYS.

Patented June 26, 1951

2,558,376

UNITED STATES PATENT OFFICE 2,558,376

SOIL AND WEED TREATING APPARATUS

Fred W. Opp, Costa Mesa, and Walter H. Opp, Altadena, Calif.

Application August 29, 1949, Serial No. 113,002

3 Claims. (Cl. 47—1.3)

This invention relates to an apparatus of the type utilizing electric currents for the purpose of treating soil and killing weeds. Electrical apparatus has heretofore been applied to the treatment of soil and also for the purpose of killing weeds. When the weeds of a soil area are destroyed by electrical apparatus it is found that subsequently planted crops are frequently benefitted beyond the mere results of weed elimination. It is believed that the electrical treatment has an effect upon the minerals of the soil so as to render these more susceptible for use as plant food.

Previous to the present invention the electrical treatment of soil and weeds has been carried out mainly through the use of mechanical contacts. While apparatus of such type is effective for weed destruction, particularly for the larger plants, it may be ineffective in destroying some of the more tiny weed plants not brought into contact with the mechanical electrodes.

It is a general object of the present invention to provide an apparatus for the electrical treatment of soil and the destruction of weeds which apparatus is more effective than that heretofore known and capable of reaching more of the small weeds than apparatus of the past. In accordance with the present invention we effect contact with the plant or soil to be treated by spraying onto the soil and to the weeds to be treated water or other conductive or partially conductive liquid which carries the electrical current which is to effect the treatment. The fluid sprayed upon the soil or weeds to be killed insures that even tiny plants which may be hidden behind clods of soil are nevertheless brought within the zone of effective treatment. By the apparatus of the present invention therefore we eliminate blind spots where in the past practice there has been ineffective weed killing.

Another object of the present invention is to provide an electrical apparatus for treatment of weeds and soil in which a novel means is included for concentrating the spray on a particular area to be acted upon.

In accordance with the apparatus of the present invention water or other partially conductive liquid is supplied continuously to a pipe spaced a few inches above the ground and carried preferably to the rear of a truck or other vehicle so as to be moved in a transverse direction. The pipe is provided at its lower side with a series of spray nozzles through which the water or other liquid is intended to be successively sprayed onto the ground or weed plants to be killed. In order to direct the liquid successively from the different spray nozzles there is provided a rotor revolving within the pipe, which rotor has one or more spirally extending grooves, which grooves thus provide means by which the fluid is successively passed to and shut off from the different sequence of spray nozzles at the lower side of the pipe. A source of high electrical potential capable of handling a number of kilowatts of power is provided on the vehicle with one side thereof grounded to the earth and the other side connected with this pipe so that the fluid spray therefrom to the weed or plant completes the electrical circuit. The water being sprayed from the different spray nozzles of the pipe thus, in effect, constitutes a liquid electrode searching out and reaching all of the area to be treated.

Other objects and advantages of the apparatus of the present invention will be more fully understood from the following description of the preferred example of an apparatus embodying the invention, the description being given in connection with the accompanying drawings, in which:

Figure 1 is a side elevation;

Figure 2 is a rear view;

Figure 3 is a fragmentary section on the line 3—3 of Figure 1;

Figure 4 is a perspective of the roller;

Figure 5 is a fragmentary section on the line 5—5 of Figure 3; and

Figure 6 is an electrical diagram.

Referring to the drawings, the apparatus of the present invention comprises a vehicle or truck 2 upon which is mounted the remaining apparatus of the invention in order that the same may be transported over an area of soil which is to be treated. Upon the truck body is mounted a tank 3 which is intended to contain water or other partially conductive material such, for example, as a salt solution, which in certain cases may be a solution of plant food such as potash, nitrate or phosphate. In order to effect lubrication of certain portions of the apparatus hereafter described the contents of the tank 3 may include some oily emulsion. The tank 3 is supported on the truck 2 by frame members 4 which are of insulating material so as to insulate the tank from the frame of the truck. A line 5 which may be controlled by a valve 6 leads from tank 3 to the pipe 7.

The pipe 7 is mounted by brackets 8 extending from the rear of the truck 2. These brackets 8 are composed of insulating material. The pipe 7 has reduced ends 9 extending into the brackets 8 which reduced ends are engaged by set screws or bolts 10.

Within the pipe 7 there is provided a rotor 11 which rotor 11 at one end is provided with a stub shaft revolvable in bearings 13 in one of the brackets 8 and at the other end the rotor 11 is provided with a stub shaft 14 which extends through a packing gland 16. The shaft 14 is provided with a gear 17 by which connection is made through a chain drive 18 to a drive shaft 19 extending from an electric motor 20 mounted on the truck 2. The stub shaft 14 of the rotor 11 at least should be constructed of the insulating material so as to electrically insulate the pipe 7 from the chain 18 and the frame of the truck 2.

The rotor 11 is provided with a central groove 21 which aligns with a boss 22 at the center of the pipe 7 which boss is connected with the line 5 leading from the tank 3. The rotor 11 is also provided with one or more spiral grooves 23 and 24 which spiral grooves are 180° advanced from each other. The spiral grooves extend from end to end on the body of the rotor 11 and make one complete rotation of the rotor. At the lower side of the center of the pipe 7 is provided a line of spaced-apart spray nozzles 25 each of which is directed vertically downwardly.

At the rear of the vehicle there are provided a number of depending rods 26, each of which is provided with a downwardly and rearwardly extending spring arm 27 which are intended for making a spring contact with the soil over which the vehicle passes and thus grounding and providing a ground connection for the apparatus. In certain cases the ground connection for the apparatus may be provided by a spray type contact similar to that shown, for example, in Fig. 3, there thus being two of these apparatuses present, one for forming each connection with the ground.

The motor 20 on the truck is indicated as driving a generator 28 which, as shown in the electrical diagram Figure 6, is connected to the primary of a transformer 29. This transformer is preferably of the type adapted to supply 5000 to 20,000 volts A. C. with several kilowatts of power. In certain cases a D. C. generator or other source of D. C. current may be supplied in place. As illustrated, however, the secondary of the transformer 28 is shown as having one side connected to grounding spring arms 27 while the other side is connected to the pipe 7.

In operation of the apparatus of the present invention it is to be understood that the apparatus is driven slowly over the area of soil to be processed. During this operation the motor 20 is continually rotating the rotor 11 through the drive-shaft 19 and chain 18. At the same time the liquid from the tank 3 is passing through line 5 into the groove 21 of the rotor 11 from which it is taken by one of the two spiral grooves 23 and 24 of the rotor and caused to be ejected from one of the nozzles 25, each nozzle 25 being in succession rendered effective. Simultaneously, a potential of from 6000 to 20,000 volts is placed between the ground and the pipe 7 so that the fluid sprayed from the successive jets 25 constitutes a means for completing a large power electric circuit. All portions of the soil and the weeds contained thereon are successively brought into treatment according to the zone of treatment so that even tiny plants are effectively reached by the apparatus. At the same time the electrical treatment acts effectively on the soil so as to condition that soil for more effective growth of subsequent planted crops.

While the particular form of the apparatus herein described is well adapted to carry out the objects of the invention it is to be understood that various modifications and changes may be made and this apparatus is of the scope set forth in the appended claims.

We claim:

1. An apparatus for treating soil and weeds which comprises means for generating a source of electrical potential, means for connecting one side of said source to the earth, a spray pipe, means for supporting said spray pipe over a soil area, said spray pipe having a series of spray nozzles in its lower end, a rotor mounted within said spray pipe, means for continually rotating said rotor, said rotor being provided with spiral grooves, means for supplying fluid to said spiral grooves whereby the fluid is emitted from said spray nozzles in succession, said spray pipe being connected to said source of potential.

2. An apparatus for treating soil and weeds which comprises means for generating a source of electrical potential, means for connecting one side of said source to the earth, a spray pipe, means for supporting said spray pipe over a soil area, said spray pipe having a series of spray nozzles in its lower end, a rotor mounted within said spray pipe, means for continually rotating said rotor, said rotor being provided with spiral grooves, means for supplying fluid to said spiral grooves whereby the fluid is emitted from said spray nozzles in succession, said spray pipe being connected to said source of potential, and means for transporting said apparatus relative to a soil area to be treated.

3. An apparatus for treating soil and weeds which comprises a vehicle, means for generating a source of electrical potential mounted on said vehicle, a fluid container mounted on said vehicle, a transversely extending spray pipe to the rear of said vehicle disposed above the ground, said pipe having a plurality of spray nozzles directed downwardly, means for supplying fluid from said tank to said pipe, a rotor revolvable in said pipe for directing said fluid to said spray nozzles in succession, and means connecting said spray pipe to said source of potential so as to act as an electrode thereof.

FRED W. OPP.
WALTER H. OPP.

No references cited.